United States Patent Office 2,992,193
Patented July 11, 1961

2,992,193
NEW EPOXY RESINS
Daniel Porret, Monthey, Willy Fisch, Binningen, and Otto Ernst, Pfeffingen, Switzerland, assignors to Ciba Limited, Basel, Switzerland, a Swiss firm
No Drawing. Filed July 7, 1959, Ser. No. 825,414
Claims priority, application Switzerland July 8, 1958
6 Claims. (Cl. 260—2)

This invention relates to new epoxy resins, being Diels-Alder adducts containing epoxide groups, and to processes for the manufacture thereof.

It is known to produce hardened epoxide resin compounds which, when an attempt is made to ignite them are self-extinguishing, by using chlorinated polycarboxylic acid anhydrides, such as hexachloro-endomethylene tetrahydrophthalic acid anhydride, as hardener for the conventional epoxy resins, such as the polyglycidyl ethers obtainable by condensation of polyhydric phenols, e.g. bis-(4-hydroxyphenyl)-dimethyl methane, and epochlorhydrin in the presence of alkali. The mixtures of such known epoxy resins and chlorinated polycarboxylic acid anhydrides, however, only harden on heating, a step which is undesirable in many potential applications of the mixtures. Furthermore, such heat-hardenable mixtures generally only have a very short pot-life.

According to the present invention there are provided new Diels-Adler adducts of dienes containing at least one halogen atom, preferably halogenated cyclopentadienes, and dienophilic compounds containing at least two epoxide groups, preferably diglycidyl or polyglycidyl ethers of dienophilic unsaturated dialcohols or polyalcohols. The term "dienophilic" is used to refer to compounds known per se from their structure to be capable of combining with dienes in the Diels-Alder addition reaction.

It has been found that the said adducts, being novel epoxy resins, are hardenable in the cold by treatment with amines to form self-extinguishing epoxy resin compounds. The halogenated epoxy resins of this invention can, if desired, also be hardened by heating with dicarboxylic or polycarboxylic acid anhydrides, and such heat-hardenable mixtures generally have a longer pot-life than mixtures of chlorinated polycarboxylic acid anhydrides and conventional epoxy resins.

According to a further feature of the invention the aforesaid Diels-Alder adducts are obtained by subjecting to Diels-Alder addition dienes containing at least one halogen atom and dienophilic compounds containing at least two epoxide groups, with formation of a six-membered carbocyclic ring having one unsaturated position.

As halogenated dienes, there may be employed halogen derivatives of butadiene, isoprene, 1-methyl butadiene, 2,3-dimethyl butadiene, 1-acetoxy-butadiene, anthracene, furan, alkyl furans, higher-substituted furans, coumalins, cyclohexadiene, 2,3-dimethyl cyclohexadiene, 1,1'-dicyclohexenyl, cyclopentadienone, aryl cyclopentadienones and more especially cyclopentadiene. Particularly useful halogenated dienes are 2-chlorobutadiene, tetrachloropentadienone and more especially dimethoxytetrachlorocyclopentadiene and hexachlorocyclopentadiene.

Dienophilic compounds containing epoxide groups which may be used are, for example, unsaturated ethers or esters containing at least two glycidyl groups. It is advantageous to start from diglycidyl or polyglycidyl ethers of unsaturated dialcohols or polyalcohols, such as 2 - butene - 1,4 - diol, 1,1 -bis - (hydroxymethyl) - cyclohex - 3 - ene, 1,1 -bis - (hydroxymethyl) - 6 - methylcyclohex - 3 -ene, 1,1 - bis - (hydroxymethyl) - 2,4,6-trimethyl - cyclohex - 3 - ene, 1,1 - bis - (hydroxymethyl) - 2,5 - endomethylene - cyclohex - 3 - ene and 1,1 - bis - (hydroxymethyl) - 4 - chlorocyclohex - 3 - ene. Also suitable are diglycidyl and polyglycidyl esters of unsaturated dicarboxylic acids, such as acetylene dicarboxylic acid, maleic acid and especially fumaric acid. The 2-butene-1,4-diol diglycidyl ether and fumaric acid diglycidyl ester are especially useful.

It is advantageous to use equimolecular quantities of the starting compounds for carrying out the addition reaction. However, it is also possible to use the diene or the dienophilic component in excess and then to recover the excess starting product, for example by distillation from the reaction mixture.

The reaction is conveniently carried out at temperatures between 80° C. and 250° C. and preferably between 100 and 150° C. At temperatures above 150° C., the reaction is preferably carried out in an autoclave.

The Diels-Alder adducts containing epoxide groups and obtained according to the present invention react with the conventional hardeners for epoxide compounds. Consequently, by addition of such hardeners, they can be cross-linked or cured in a manner analogous to other polyfunctional epoxide compounds and epoxide resins. Basic or acid compounds may be employed as hardeners and the following are examples of compounds which have proved to be suitable: amines or amides, such as aliphatic and aromatic primary, secondary and tertiary amines, for example mono-, di- and tributyl-amines, p-phenylenediamine, ethylenediamine, N,N-diethyl-ethylene diamine, diethylene - triamine, diethylene - tetramine, tetraethylenepentamine, trimethylamine, diethylamine, triethanolamine, Mannich bases, piperidine, piperazine, guanidine and guanidine derivatives, such as phenyl diguanidine, diphenyl guanidine, dicyandiamide, aniline-formaldehyde resins, urea-formaldehyde resins, melamine-formaldehyde resins, polymers of amino styrenes, polyamides, for example those of aliphatic polyamines and dimerized or trimerized unsaturated fatty acids; isocyanates and isothiocyanates; polyhydric phenols, for example resorcinol, hydroquinone, quinone, phenolaldehyde resins, oil-modified phenol-aldehyde resins, reaction products of aluminum alcoholates or phenolates with tautomerically reacting compounds of the type of acetoacetic ester, Friedel-Crafts catalysts, for example $AlCl_3$, $SbCl_5$, $SnCl_4$, $FeCl_3$, $ZnCl_2$, $BF_3$ and their complexes with organic compounds; phosphoric acid; polybasic carboxylic acids and their anhydrides, for example phthalic anhydride, methyl endomethylene tetrahydrophthalic anhydride, dodecenyl succinic acid anhydride, hexahydrophthalic acid anhydride or endomethylene tetrahydrophthalic acid anhydride or mixtures thereof; maleic or succinic acid anhydrides. It is possible, where required, to use concurrently accelerators such as tertiary amines as well as polyhydroxy compounds having a cross-linking action. The expression "hardening," as used herein, means the conversion of the aforesaid epoxide compounds to form insoluble and infusible resins.

According to a further feature of the present invention therefore there are provided, as new compositions of matter, hardenable mixtures which contain the Diels-Alder adducts as set forth above together with hardening agents therefor.

The hardenable Diels-Alder adducts containing epoxide groups or the mixtures of such adducts with hardeners may have fillers, plasticisers, coloring substances and the like added thereto in any phase prior to the hardening. Asphalt, bitumen, glass fibers, mica, powdered quartz, cellulose, kaolin, finely divided silica (Aerosil) or metal powder can for example be used as extenders and fillers.

The mixtures of the polyglycidyl ethers and hardeners according to the invention can be used in the unfilled or filled condition, as well as in solution or emulsion, as textile auxiliaries, lamination resins, lacquers, paints, dipping resins, casting resins, coating, filling and trowelling compounds, adhesives, and the like or for the production of such agents.

The following examples, parts represent parts by weight, percentages represent percentages by weight, the ratio between parts by weight and parts by volume being as between kilograms and liters, and the temperatures are given in degrees centigrade:

Example 1

An equimolecular mixture of 69 parts of hexachloropentadiene and 50 parts of 2-butene-1,4-diol-diglycidyl ether is heated for 14 hours at 120° C. in a reaction vessel provided with a reflux condenser, thermometer and stirrer. The reaction mixture is then allowed to cool and it is subjected to a fractional distillation at 0.1 mm. Hg.

The following fractions are recovered:

60°/0.1 mm.—40 parts of hexachlorocyclopentadiene
100/115°/0.1 mm.—26 parts of 2-butene-1,4-diol-diglycidyl ether.

As residue, there remain 53 parts of a viscous liquid which consists mainly of the adduct having the formula:

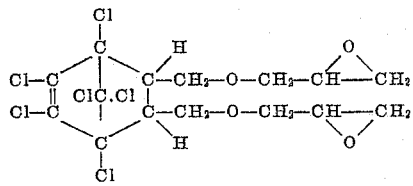

This product can be cured with the conventional hardeners for epoxy resins, such as triethylene tetramine, to form an infusible resin which can only be burnt with difficulty.

Epoxide content of the product: found—3.65 mols of epoxide groups per kg.; calcd.—4.24 mols of epoxide groups per kg.

Example 2

An equimolecular mixture of 35 parts of 1,1-dimethoxy-2,3,4,5-tetrachlorocyclopentadiene and 27 parts of 2-butene-1,4-diol-diglycidyl ether is heated for 23 hours to 140° C. The reaction mixture is then subjected to fractional distillation at 0.1 mm. Hg., the following fractions being recovered:

70°/0.1 mm.—15 parts of dimethoxytetrachlorocyclopentadiene,
110–115°/0.1 mm.—7 parts of 2-butene-1,4-diol-diglycidyl ether.

As residue, there remain 48 parts of a brownish-colored oil with an epoxide content of 3.60 epoxide equivalents per kg., which consists mainly of the adduct of the formula

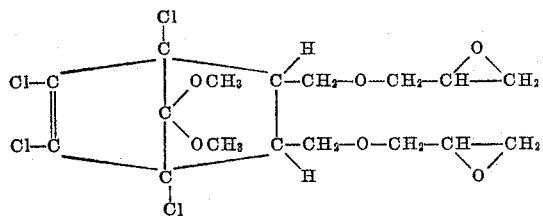

This product can be cured with the conventional hardeners for epoxy resins, such as phthalic acid anhydride, to form an infusible resin which is difficult to ignite.

Example 3

(a) In a reaction vessel provided with a stirrer, thermometer, dropping funnel and reflux condenser, 142 parts (1 mol) of 1,1-bis-(hydroxymethyl)-cyclohex-3-ene are dissolved in 400 parts by volume of benzene by heating to 80°. 0.7 part by volume of a 40% diethyl ether solution of boron trifluoride is added and then 185 parts (2 mols) of epichlorhydrin are added dropwise at the same temperature within about 15 minutes. The reaction mixture is kept for a total of 4½ hours at 80° and 0.3 part by volume of the boron trifluoride solution is added after 90 minutes and another 0.3 part by volume thereof after 3 hours. The mixture is then cooled to 25° and 160 parts of 50% sodium hydroxide solution are added dropwise, the temperature rising. After one-third of the sodium hydroxide solution has been added dropwise, the temperature is raised to 70° and the remainder of the sodium hydroxide solution is added fairly quickly. After 30 minutes, the mixture is diluted with 100 parts by volume of ethanol and after 75 minutes, calculated from the commencement of the addition of sodium hydroxide solution, the mixture is cooled. The benzene layer is then removed, washed with 300 parts by volume of water and the solvent distilled off, finally in water-jet vacuum. There are left 262 parts of crude diglycidyl ether of 1,1-bis(hydroxy methyl)-cyclo-hex-3-ene with an epoxide content of 69% of the theoretical and a chlorine content of 5.1%. By careful fractionation under high vacuum, there are obtained from the crude product 100 parts of 1,1-bis-(hydroxy-methyl)-cyclohex-3-ene-diglycidyl-ether, B.P. $_{0.015}$ 103–110°, with an epoxide content of 83.7% of the theoretical.

A mixture of 97 parts of the above-described diglycidyl ether of 1,1-bis-(hydroxymethyl)-cyclohex-3-ene and 156 parts (corresponding to a 50% molar excess) of hexachlorocyclopentadiene is heated for 15 hours at 40°.

88 parts of excess hexachlorocyclopentadiene are then distilled off under a vacuum of 0.1 mm. Hg. and there are obtained as residue 161 parts of a light brownish-colored liquid with an expoxide content of 3.91 epoxide equivalents per kg. (resin A) which consists mainly of the adduct of the formula

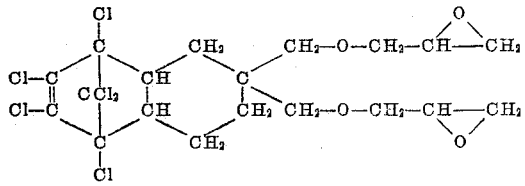

(b) 852 parts of 1,1-bis-(hydroxymethyl)-cyclohex-3-ene are dissolved in 2500 parts by volume of chloroform and heated to 70° after adding 4 parts by volume of boron trifluoride in diethyl ether. While stirring, 1110 parts of epichlorhydrin (molar ratio dialcohol:epichlorhydrin=1:2) are then carefully added dropwise thereto. After about 30 minutes, an exothermic reaction commences. By regulating the speed of dropwise addition, the reaction mixture can be kept without heating at the boiling point of the chloroform. After completing the dropwise addition, the mixture is stirred at 70° until no more epoxide can be detected. 480 parts of NaOH, dissolved in alcohol, are now slowly added at room temperature and, at the latest after 30 minutes, the mixture is shaken 2 or 3 times with water and finally with a small amount of a solution of 33 parts of monosodium phosphate in 100 parts of water (pH 5 to 6). The aqueous layers are extracted once or twice with chloroform and the combined chloroform solution dried over sodium sulfate. After evaporating the chloroform, the residue is distilled in vacuo.

There are obtained 1343 parts of a polyether mixture, B.P. 120–150° at 0.2 to 0.5 mm. Hg, with an epoxide content 6.4 epoxide equivalents/kg. The mixture consists for the major part of the diglycidyl ether of 1,1-bis-(hydroxymethyl)-cyclohex-3-ene.

A mixture of 97 parts of the above-described crude diglycidyl ether and 156 parts of hexachlorocyclopentadiene is heated over a period of 15 hours to 140°. A first batch is distilled at an external temperature of 130° and a vacuum of 0.4 mm. Hg. With an internal temperature of 64–66°, 88 parts of hexachlorocyclopentadiene distill off and there remain as residue 163 parts of a light brown liquid with an epoxide content of 3.33 epoxide equivalents/kg. (resin B).

A second batch is distilled at an external temperature of 150° and a vacuum of 0.4 mm. Hg. With an internal temperature of 64–66°, 100 parts of hexachlorocyclopentadiene distil off and there remain as residue 151 parts of a light brown liquid with an epoxide content of 3.75 epoxide equivalents/kg. (resin C).

Example 4

A mixture of 30 parts of the diglycidyl ether of 1,1-bis-(hydroxymethyl)-cyclohex-3-ene as described in Example 3 and 46 parts (corresponding to a 50% molar excess) of 1,1-dimethoxy-2,3,4,5-cyclo-pentadiene are heated over a period of 15 hours to 140°.

18 parts of excess dimethoxytetrachlorocyclopentadiene are then distilled off at reduced pressure and there are obtained 54 parts of a dark-colored oil with an epoxide content of 2.97 epoxide equivalents per kg., which consists mainly of the adduct of the formula

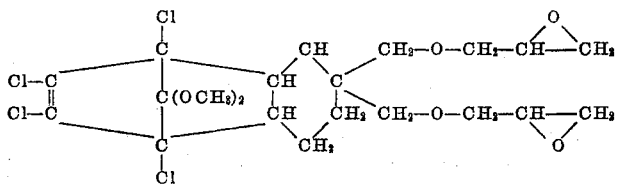

The product obtained can be cured for example with phthalic acid anhydride to form an infusible resin which is difficult to burn.

Example 5

43 parts of phthalic acid anhydride are dissolved at 120–130° in 100 parts of the product obtained according to Example 1. The mixture has at 120° a viscosity lower than 20 cp. and after 9 hours at 120°, a viscosity of 1500 cp. The mixture is hardened in an aluminum mould (40 x 10 x 140 mm.) for 24 hours at 140°. The moulding which is obtained is difficult to burn and is self-extinguishing and has the following properties:

Impact bending strength _____ cm. kg./cm.$^2$__ 13.2
Bending strength _____kg./mm.$^2$__ 12.4
Water absorption after 4 days at 20°____percent__ 0.13

Degreased and polished aluminum sheets (170 x 25 x 15 mm.), obtainable under the name "Anticorodal B," are stuck together with an overlap of 10 mm. with the mixture obtained as above. After hardening for 24 hours at 140°, the shearing strength is 1.33 kg./mm.$^2$.

If the mixture is poured in layer thicknesses of $\frac{1}{10}$ mm. and 1 mm. on glass sheets with an overlap of 10 mm. with the mixture obtained as above. After hardening for 24 hours at 140°, the shearing strength is 1.33 kg./mm.$^2$.

If the mixture is poured in layer thicknesses of $\frac{1}{10}$ mm. and 1 mm. on glass sheets with subsequent hardening for 24 hours at 140°, the films obtained have excellent bonding strength and are resistant to the action for 1 hour at room temperature of 5N-sodium hydroxide solution, 5N-sulfuric acid, acetone and chlorobenzene.

Example 6

100 parts of a polyglycidyl ether (resin A) prepared according to Example 3 are mixed with 43 parts of phthalic acid anhydride and heated to 120–130°. The homogeneously dissolved mixture has at 120° a viscosity lower than 20 cp. and after 85 hours a viscosity of 1500 cp.

A casting prepared from the above mixture in a manner analogus to Example 5 has the following properties after hardening for 24 hours at 140°:

Impact bending strength _____cm. kg./cm.$^2$__ 10.6
Bending strength _____kg./mm.$^2$__ 12.7
Water absorption after 4 days at 20°____percent__ 0.16

An adhesive joint made with the above mixture according to the data given in Example 5 has a shearing strength of 1.57 kg./mm.$^2$.

On pouring the mixture in thin layers and hardening as described in Example 5, the resulting films show an excellent bonding strength with the support and good resistance to 5N-sulfuric acid, 5N-sodium hydroxide solution, water, actone and chlorobenzene.

Example 7

Samples of a polyglycidyl ether (resin B) prepared according to Example 3 and also samples of an epoxide resin which is liquid at room temperature and which has an epoxide content of about 5.3 epoxide equivalents/kg., produced by reacting epichlorhydrin with bis-(4-hydroxyphenyl)-dimethyl methane in the presence of alkali (resin D) and samples of mixtures of resins B and D in two different proportions, are melted with phthalic acid as hardening agent, 0.85 equivalents of anhydride groups being used in each case to one equivalent of epoxide groups of the resins or resin mixtures.

A first batch of each of the hardenable mixtures is processed to form castings as described in Example 5, while a second batch of these mixtures is used for the production of adhesive bonds, in a manner analogous to Example 5. The hardening in each case is carried out for 24 hours at 140°.

The properties of the hardened castings and adhesive bonds will be seen from the following table

| Parts Resin B | Parts Resin D | Pot-life at 120° to 1,500 cp. in min. | Impact bending strength, cm. kg./mm.$^2$ | Shearing Strength, kg./mm. | Combustibility |
|---|---|---|---|---|---|
| 100 | 0 | 230 | 10.3 | 1.35 | Self-extinguishing. |
| 70 | 30 | 228 | 12.1 | 1.60 | Do. |
| 50 | 50 | 226 | 12.7 | 1.60 | Do. |
| 0 | 100 | 190 | 10.8 | 1.15 | Burns. |

Similar properties are obtained if the phthalic anhydride is replaced by the methyl endomethylene tetrahydrophthalic acid anhydride which is liquid at room temperature, or the liquid mixture prepared by blending and consisting of 78% of hexahydrophthalic acid anhydride, 13% of tetrahydrophthalic acid anhydride and 9% of phthalic acid anhydride as hardening agent.

Example 8

Samples of the resin D described in Example 7 and of a mixture of 50 parts of a polyglycidyl ether (resin C) prepared according to Example 3 and 50 parts of resin D are stirred with triethylene tetramine as hardening agent, ⅙ mol of triethylene tetramine being used in each case to 1 epoxide equivalent.

A first batch of each of the hardenable mixtures (each 90 g.) is processed to form castings as described in Example 5, while a second batch of the mixtures is used for the production of films with a thickness of 1 mm. in a manner analogous to Example 5, but with the difference that the hardening takes place at room temperature and that the gelling times, i.e. the time after which the liquid mixture has solidified to form a gel, are established.

The gelliing times observed at room temperature and the properties of the casting cured or hardened for 24 hours at room temperature are indicated in the following table:

| Parts Resin C | Parts Resin D | Gelling Time in minutes | | Impact bending strength cm. kg./ cm.² | Bending strength, kg./mm.² | Combustibility |
|---|---|---|---|---|---|---|
| | | Casting | Film | | | |
| 0 | 100 | 25 | 100 | 22.8 | 11.6 | Burns. |
| 50 | 50 | 19 | 75 | 23.4 | 12.4 | Self-extinguishing. |

What is claimed is:

1. A Diels-Alder adduct of (A) a diene selected from the group consisting of hexachlorocyclopentadiene and 1,1-dimethoxy-2,3,4,5-tetrachlorocyclopentadiene and (B) a dienophilic compound selected from the group consisting of 2-butene-1,4-diol-digylcidyl ether, the diglycidyl ether of 1,1-bis-(hydroxymethyl)-cyclohex-3-ene and the diglycidyl ether of 1,1-bis-(hydroxymethyl)-6-methyl-cyclohex-3-ene.

2. The compound of the formula

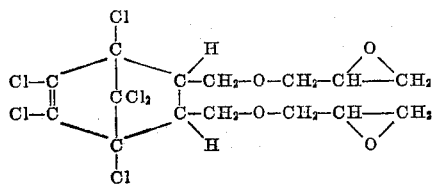

3. The compound of the formula

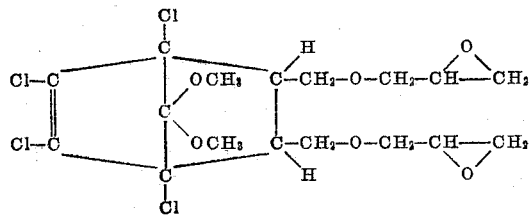

4. The compound of the formula

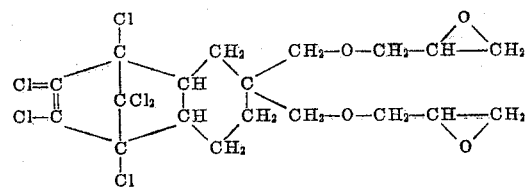

5. The compound of the formula

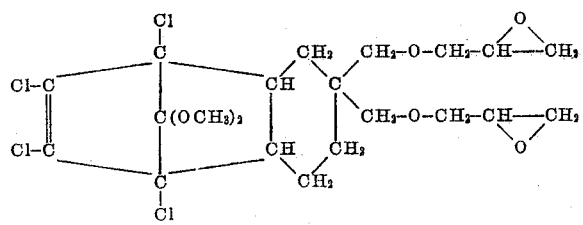

6. A composition of matter comprising a Diels-Alder adduct of (A) a diene selected from the group consisting of hexachlorocyclopentadiene and 1,1-dimethoxy-2,3,4,5,-tetrachlorocyclopentadiene and (B) a dienophilic compound selected from the group consisting of 2-butene-1,4-diol-diglycidyl ether, the diglycidyl ether of 1,1-bis-(hydroxymethyl)-cyclohex-3-ene and the diglycidyl ether of 1,1-bis-(hydroxymethyl)-6-methylcyclohex-3-ene and a curing agent for epoxy resins.

References Cited in the file of this patent

UNITED STATES PATENTS

| | | |
|---|---|---|
| 2,581,464 | Zech | Jan. 8, 1952 |
| 2,616,899 | Ladd | Nov. 4, 1952 |
| 2,792,381 | Shokal et. al | May 14, 1957 |
| 2,834,790 | Bressler et al. | May 13, 1958 |
| 2,870,170 | Payne et al. | Jan. 20, 1959 |
| 2,874,150 | Christenson | Feb. 17, 1959 |
| 2,882,279 | Luvisi et al. | Apr. 14, 1959 |
| 2,894,976 | Banes et al. | July 14, 1959 |

UNITED STATES PATENT OFFICE
CERTIFICATION OF CORRECTION

Patent No. 2,992,198                                         July 11, 1961

Daniel Porret et al.

It is hereby certified that error appears in the above numbered patent requiring correction and that the said Letters Patent should read as corrected below.

Column 1, line 28, for "Diels-Adler" read -- Diels-Alder --; column 3, line 18, for "100/115°/0.1 mm." read -- 110/115°/0.1 mm. --; column 4, line 31, for "expoxide" read -- epoxide --; column 6, line 11, for "actone" read -- acetone --; column 5, Example 4, the center portion of the formula should appear as shown below instead of as in the patent:

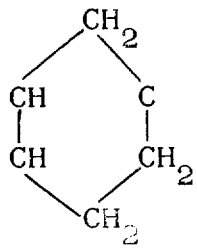

Signed and sealed this 28th day of November 1961.

(SEAL)
Attest:

ERNEST W. SWIDER                                        DAVID L. LADD

Attesting Officer                                             Commissioner of Patents